Patented Nov. 3, 1953

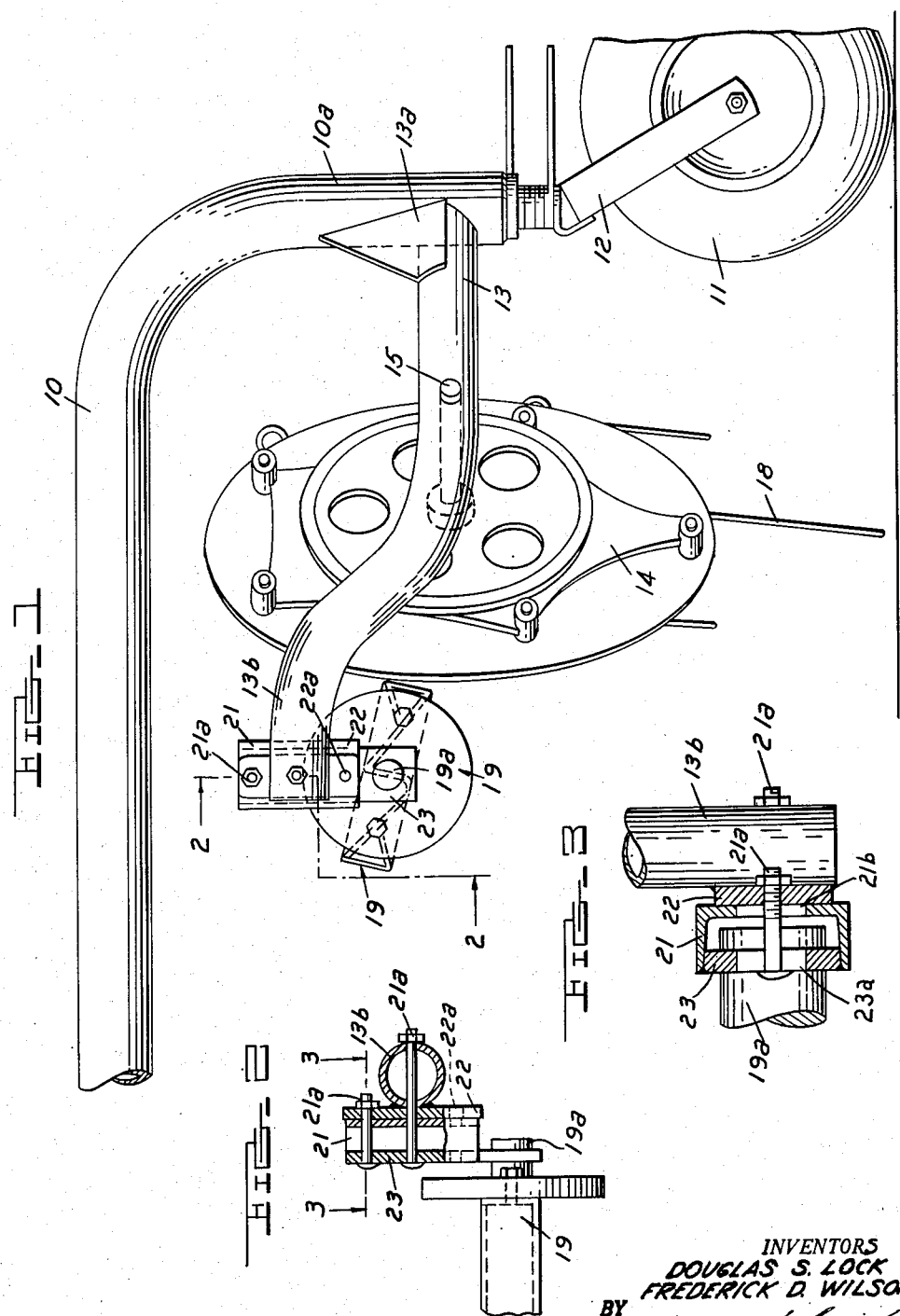

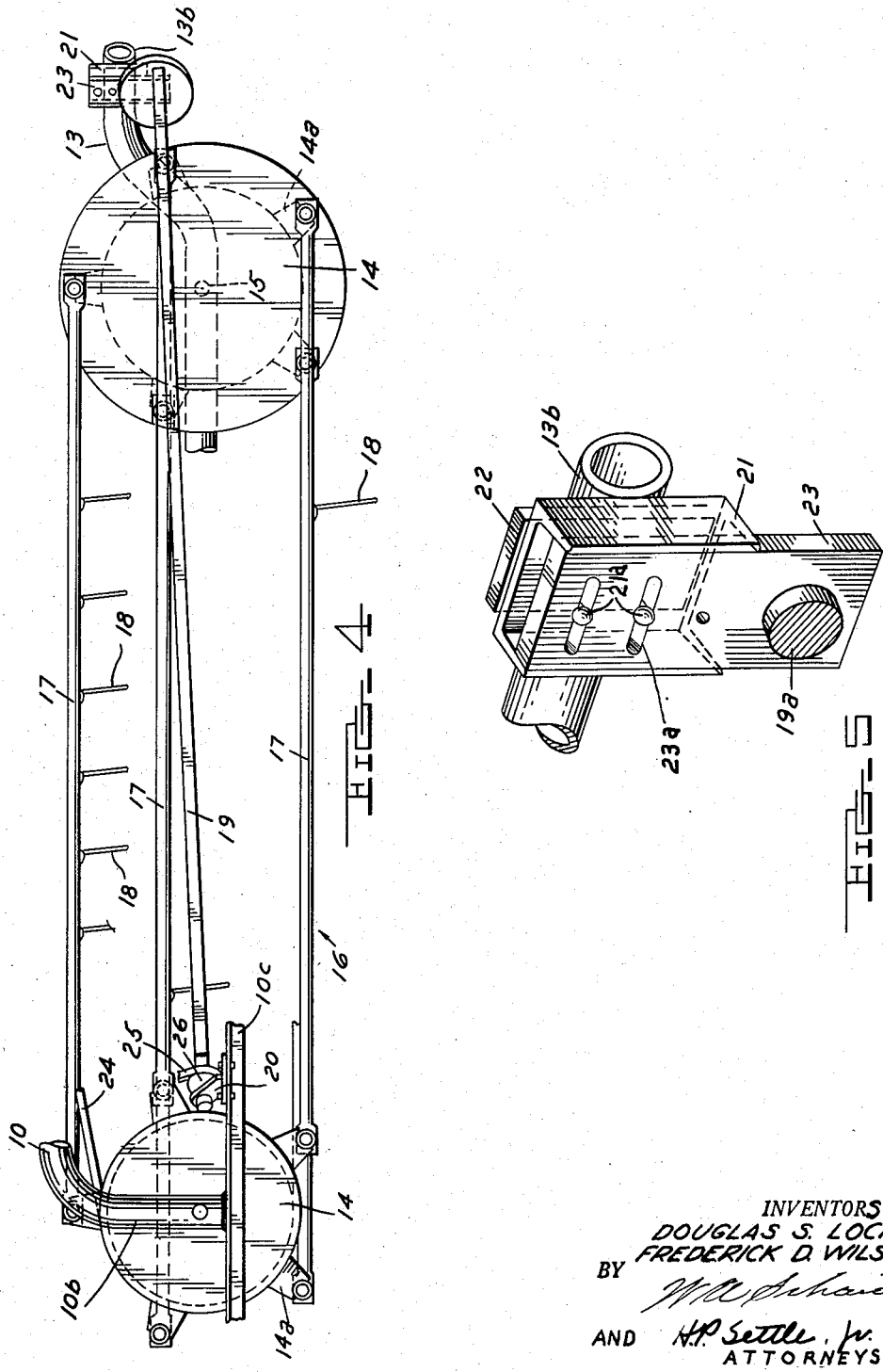

2,657,520

UNITED STATES PATENT OFFICE 2,657,520

ROTARY STRIPPER FOR SIDE DELIVERY RAKES

Douglas S. Lock and Frederick D. Wilson, Birmingham, Mich., assignors to Dearborn Motors Corporation, Birmingham, Mich., a corporation of Delaware Application January 11, 1952, Serial No. 265,986

7 Claims. (Cl. 56—377)

This invention relates to an improved rotary crop stripper for side delivery rakes.

Side delivery rakes are popular implements among farmers for raking a mowed crop, primarily because such implements deliver the raked crop into a single windrow with a minimum of operator attention and effort. The depositing of a mowed crop into a single windrow conveniently arranges the crop for subsequent gathering by a hay baler or buck rake.

Side delivery rakes now in common use employ a rotary raking drum or reel and the rotary path defined by such drum is either cylindrical or elliptical, depending upon the placement of the end discs which support the tooth bars of the raking drum. The raking drum is angularly disposed relative to the line of travel of the side delivery rake so that the mowed crop is passed from the leading end of the raking drum in a sideward and rearward direction where it is deposited in a single windrow at the discharge end of the rake. Obviously more hay will be handled at the discharge end of the rake than at the leading end. A plurality of raking teeth are provided on the tooth bars which effect the raking of the hay. As the raking drum rotates, most of the hay falls off of the raking teeth by the action of gravity after they are raised from their crop engaging position as the drum rotates, but unfortunately, a certain amount of the crop clings to or wraps around the raking teeth. To overcome this condition, strippers have been provided to clear the teeth of the crop to prevent wrapping of the crop about the drum or reel. In those raking implements which utilize rotary crop strippers, it has been found that there is, nevertheless, considerable wrapping of the crop, particularly at the discharge end of the raking drum.

It is, therefore, an object of this invention to provide an improved rotary crop stripper for a side delivery rake which effectively eliminates wrapping of the crop about the reel of the rake.

Another object of this invention is to provide an improved rotary crop stripper and mounting therefor for a side delivery rake which permits adjustment of the position of its axis relative to the axis of the raking drum to provide optimum divergence of the rotary crop stripper for the crop condition encountered.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary side view of a side delivery rake showing the adjustable mounting of the crop stripper at the discharge end of the rake;

Figure 2 is an enlarged sectional view taken along the plane 2—2 of Figure 1;

Figure 3 is an enlarged sectional view taken along the plane 3—3 of Figure 2;

Figure 4 is a somewhat schematic view showing the angular relationship of the crop stripper relative to the raking drum; and Figure 5 is a detail perspective view of the adjustable mounting bracket for the rotary crop stripper.

As shown on the drawings:

Figure 1 partially shows in side elevation an end portion of one side of the frame which comprises a tubular member 10 having a downwardly bent end portion 10a for supporting one end of the rotary elements comprising a portion of the rake as will be briefly described. The lower end 10a of the frame member 10 is supported by a caster wheel 11 which is rotatably mounted in a fork 12 having its upright stem portion threadably secured in the lower end of the end portion 10a for vertically adjusting the frame member 10. A tubular arm 13 has its rear end welded to the lower extremity of the portion 10a of frame member 10 and a gusset plate 13a reinforces such juncture. A spider 14 is rotatably mounted on a horizontal stub shaft 15 suitably mounted in the horizontal arm 13. Spider 14 defines one end of a raking drum 16, as best shown in Figure 4. An identical spider 14 similarly rotatably mounted on another depending end portion 10b (Figure 4) of frame 10 defines the other end of the raking drum. Each of the spiders 14 has a plurality of equally angularly disposed radially extending arms 14a. A plurality of raking tooth bars 17 have their ends suitably journaled to a selected pair of arms 14a of spiders 14. The tooth bars 17 have a plurality of raking teeth 18 suitably secured in depending relationship thereto, as best shown in Figure 1. All of the above described elements are of substantially well-known construction and hence further description is not believed necessary.

Crop stripper 19 is rotatably mounted on the rake frame 10 for stripping any crop clinging or wrapped about the rake teeth 18 to prevent clogging of the raking drum. The crop stripper is essentially a rectangular bar and such bar is conveniently formed by bending a single longitudinal sheet into a saw tooth configuration in cross section, as best shown in Figure 1. The longitudinal edges of stripper bar 19 are bent inwardly, as best shown in Figure 1, and such edges are welded to the adjacent portions of the stripper.

It should be mentioned here that, as is customary, the forward end of the raking drum 16 is disposed ahead of its rear end so that such raking drum is angularly disposed relative to the line of travel of the rake with its axis lying in a horizontal plane. Thus material gathered at the forward end of the rake is delivered sidewardly and rearwardly for deposition into a single windrow at the rear or discharge end of drum 16.

Crop stripper 19 is mounted adjacent the rotary path of drum 16 and, accordingly, has its forward end suitably journaled in a bracket 20 bolted or otherwise secured to a horizontal angular frame member 10c welded to the extreme lower end of the depending end portion 10b of frame 10. Bracket 20 disposes the forward end of the longitudinal axis of stripper 19 in substantially the same horizontal plane as that of the axis of drum 16. The axis of stripper 19, however, is vertically inclined relative to the axis of raking durm 16 and diverges toward the discharge end of raking drum 16.

The rear end of crop stripper 19 is suitably journaled in a support 21 which is conveniently attached to an upwardly and rearwardly bent end portion 13b of the horizontal arm 13. Support 21 comprises a channel shaped member and is adjustably secured to a plate-like bracket 22 vertically welded to the extreme end of the bent portion 13b of arm 13. A pair of bolts 21a are selectively insertable through vertically spaced holes 22a in bracket 22 and through suitable vertically spaced slots 21b in support 21. Support 21 has a plate 23 vertically welded between its arm portions which has a plurality of vertically spaced slots 23a therein through which the bolts 21a are inserted which permits limited horizontal and vertical adjustment of the support 21. The lower end of plate 23 journals the stub shaft 19a provided in each end of crop stripper 19. It should be noted that the rear end of stripper 19 extends a substantial distance beyond the tooth bars 17.

The raking drum is power-driven in any conventional manner by suitable connection to the power-take-off of the tractor (not shown) as by a belt 24 which engages a groove provided in the periphery of the left hand end spider of the raking drum 16, as best shown in Figure 4. The crop stripper 19 is driven by a belt 25 surrounding a pulley 26 suitably mounted on its left hand end, as best shown in Figure 4. Belt 25 is suitably connected to the power source so that the crop stripper 19 is rotated in timed relation, but opposite direction, to the raking drum 16, while drum 16 is rotated in timed relation to the forward speed of the tractor towing the rake. Further description of the driving arrangement for respectively rotating the drum 16 and the crop stripper 19 is believed unnecessary as we are not here concerned with such arrangement.

In the operation of the rake, the raking drum 16 is rotated to move the tooth bars 17 in a cylindroid path. The rake teeth 18 mounted along such tooth bars are then moved in a corresponding rotary path and closely pass by the rotating crop stripper. The direction of rotation of the crop stripper 19 is opposite to that of the rotation of the raking drum 16, hence as the teeth 18 pass by the crop stripper 19, such of the crop clinging to or wrapped around the raking teeth is then removed by the action of the rotating crop stripper. Obviously, the largest portion of the crop falls off of the tines 18 as the raking drum rotates, through the action of gravity. However, such of the crop that remains on the teeth is effectively removed by the crop stripper 19. The vertical inclination of the crop stripper 19 above the axis of the rotating drum 16 and its extension beyond the rear extremity of the raking drum provides additional clearance for the windrowed crop at the discharge end of the raking drum, and such arrangement substantially eliminates wrapping of the crop about the end portions of the raking drum or the stripper. The adjustability of the extreme rear end of the crop stripper 19 through the medium of bracket 21 permits vertical adjustment of the extreme rear end of the crop stripper 19 to suit heavy or light crop conditions. The heavier the crop, the greater the divergence required of the crop stripper 19. Obviously the stripper 19 can be mounted so that its axis will diverge downwardly from the axis of the raking drum 16 and to suit special crop conditions the entire stripper can be easily mounted below the axis of the raking drum.

From the foregoing description, it is thus clearly apparent that there is here provided an improved crop stripper and mounting therefor which effectively and conveniently eliminates wrapping of the crop about the discharge end of the cylinder, as well as providing for more effective stripping of the raking teeth.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a side delivery rake having a horizontal rotatable crop raking drum with its axis angularly disposed relative to its line of travel for side discharge of the mowed crop into a windrow, the improvement comprising a rotary crop stripper, means for rotatably mounting one end of said crop stripper on the rake adjacent the forward end of the rotary path of the raking drum and in substantially the same horizontal plane as the axis of such drum, said other end of said crop stripper extending substantially beyond the discharge end of the raking drum, an arm secured to said rake frame, and a bracket on said arm for rotatably mounting said other end of said crop stripper in an adjustable relation with respect to the axis of the discharge end of the raking drum.

2. In a side delivery rake having a horizontal rotatable crop raking drum with its axis angularly disposed relative to its line of travel for side discharge of the mowed crop into a windrow, the improvement comprising a rotary crop stripper, means for rotatably mounting said stripper on the rake, said stripper being disposed closely adjacent the path of rotary movement of the raking drum and having its rear end projecting substantially beyond the discharge end of the raking drum, and a bracket comprising a vertically disposed plate-like support member rigidly secured to said rake frame and a vertically disposed channel-shaped member adjustably secured to said plate-like support, said channel-shaped member having a plate vertically secured to its arm portions to form a unit therewith, said plate having said end of said stripper rotatably journaled thereon, said unit being detachably secured to said plate-like support whereby the end of said stripper may be adjustably vertically inclined relative to the raking drum axis with its high end adjacent the discharge end of the drum.

3. The bracket defined in claim 2 wherein said unit and said plate have a plurality of vertically spaced and aligned holes therein, and bolts insertable in said holes to vertically selectively secure said unit to said plate.

4. In a slide delivery rake having a horizontal rotatable crop raking drum with its axis angularly disposed relative to its line of travel for side discharge of the mowed crop into a windrow, the improvement comprising a rotary crop stripper, means for rotatably mounting one end of said crop stripper on the rake adjacent the forward end of the rotary path of the raking drum and in substantially the same horizontal plane as the axis of such drum, said other end of said crop stripper extending substantially beyond the discharge end of the raking drum, and a bracket comprising a vertically disposed plate-like support member rigidly secured to said rake frame and a vertically disposed channel-shaped member adjustably secured to said plate-like support, said channel-shaped member having a plate vertically secured to its arm portions to form a unit therewith, said plate having said end of said stripper rotatably journaled thereon, said unit being detachably secured to said plate-like support whereby a selected divergence of said crop stripper relative to the discharge end of the drum is obtained.

5. The bracket defined in claim 4 wherein said unit has a plurality of vertically spaced and horizontally disposed slots therein and said plate has a plurality of vertically spaced holes therein, said slots and said holes being aligned, and bolts inserted in said slots and said holes to horizontally selectively secure said unit to said plate.

6. In a side delivery rake having a horizontal rotatable crop raking drum with its axis angularly disposed relative to its line of travel for side discharge of the mowed crop into a windrow, the improvement comprising a rotary crop stripper, means for rotatably mounting one end of said stripper on the rake adjacent the forward end of the rotary path of the raking drum and in substantially the same horizontal plane as the axis of such drum, a laterally extending arm secured to said rake, bearing means on said arm for rotatably journaling said reel, and adjustable bracket means on said arm for rotatably journaling said stripper in a selected position with respect to the axis of the discharge end of said reel.

7. The combination defined in claim 6 wherein the outer end of said arm extends upwardly above the axis of the raking drum and rearwardly of the discharge end of the drum, and said bracket means is secured to said outer end of said arm for rotatably mounting said stripper in a vertically adjustable position with respect to the discharge end of said reel.

DOUGLAS S. LOCK.
FREDERICK D. WILSON.

References Cited in the file of this patent

UNITED STATES PATENTS

| Number | Name | Date |
| --- | --- | --- |
| 1,251,373 | Holeman | Dec. 25, 1917 |
| 2,040,692 | Hitchcock | May 12, 1936 |